(12) United States Patent
Kasamatsu (10) Patent No.: US 6,914,915 B2
(45) Date of Patent: Jul. 5, 2005

(54) OPTICAL FIBER AMPLIFIER THAT CAN ATTAIN SUFFICIENT GAIN SHIFT EFFECT, SMALL NOISE PROPERTY AND HIGH OPERATION EFFICIENCY AT THE SAME TIME EVEN IN TWO-WAVELENGTH EXCITATION TM DOPANT OPTICAL FIBER AMPLIFIER, AND OPTICAL AMPLIFIER HAVING THE SAME

(75) Inventor: Tadashi Kasamatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 3 days.

(21) Appl. No.: 09/792,719

(22) Filed: Feb. 23, 2001

(65) Prior Publication Data

US 2001/0026654 A1 Oct. 4, 2001

(30) Foreign Application Priority Data

Mar. 1, 2000 (JP) .......................................... 2000-056320

(51) Int. Cl.$^7$ ................................................ H01S 3/30
(52) U.S. Cl. ................................ 372/6; 372/70; 372/71
(58) Field of Search .................................. 372/70, 71, 6

(56) References Cited

U.S. PATENT DOCUMENTS 5,930,029 A * 7/1999 Mehuys ........................ 372/71
6,205,164 B1 * 3/2001 Ohishi et al. .................. 372/70

FOREIGN PATENT DOCUMENTS

| JP | 2688303 | 8/1997 | |
| JP | 10163554 A | * 6/1998 | ............. H01S/3/10 |
| JP | 2000307176 A | * 11/2000 | ............. H01S/3/06 |

OTHER PUBLICATIONS

U.S. Appl. No. 09/527,421, filed Mar. 17, 2000, Tadashi Kasamatsu.
T. Kasamatsu, "1.50-μm-Band Gain-Shifted Thulium--Doped Fiber Amplifier With 1.05- and 1.56-μm Dual--Wavelength Pumping", *Optics Letters*, vol. 24, No. 23, Dec. 1, 1999, pp. 1684–1686.

H. Masuda, et al., "Wideband Erbium–Doped Fibre Amplifiers With Three–Stage Amplification", *Electronics Letters*, vol. 34, No. 6, Mar. 19, 1998, pp. 567–568.

M. Yamada, et al., "Gain–Flattened Broadband $Er^{3+}$–Doped Silica Fibre Amplifier With Low Noise Characteristics", *Electronics Letters*, vol. 34, No. 18, Sep. 3, 1998, pp. 1747–1748.

* cited by examiner

*Primary Examiner*—MinSun OH Harvey
*Assistant Examiner*—C H Jackson
(74) *Attorney, Agent, or Firm*—Dickstein, Shapiro, Morin & Oshinsky, L.L.P.

(57) ABSTRACT

A laser amplifier includes a gain medium of a glass fiber, a first exciting light source, a second exciting light source, and another first exciting light source. The gain medium of the glass fiber includes rare earth dopant in a host medium. Ions of the rare earth dopant has an energy level structure including a ground level and a pair of laser upper level and laser lower levels between which a stimulated transition is to be produced after production of a population inversion between the pair of laser upper and laser lower levels. The pair of laser upper and laser lower levels being higher than the ground level. The first exciting light source is coupled to the input side of the glass fiber for introducing first exciting light to the glass fiber to produce the population inversion. The second exciting light source is coupled to the input side of the glass fiber for introducing second exciting light source to the glass fiber to raise ions of the rare earth dopant from the ground level to the laser lower level. The second exciting light has a wavelength band different from a wavelength band of the first exciting light. The other first exciting light source is coupled to the output side of the glass fiber for introducing the first exciting light to the glass fiber. A two-way excitation is performed on the glass fiber.

19 Claims, 5 Drawing Sheets

OPTICAL FIBER AMPLIFIER THAT CAN ATTAIN SUFFICIENT GAIN SHIFT EFFECT, SMALL NOISE PROPERTY AND HIGH OPERATION EFFICIENCY AT THE SAME TIME EVEN IN TWO-WAVELENGTH EXCITATION TM DOPANT OPTICAL FIBER AMPLIFIER, AND OPTICAL AMPLIFIER HAVING THE SAME

BACKGROUND OF THE INVENTION

1. Field of the Invention

The present invention relates to an optical fiber amplifier. More Particularly, the present invention relates to an optical fiber amplifier that can attain a sufficient gain shift effect, a small noise property and a high operation efficiency at the same time, and an optical amplifier having the same.

2. Description of the Related Art

Traditionally, a rare earth element dopant optical fiber amplifier has been vigorously researched and developed as a key device in a large capacity wavelength multiplexing communication system.

An optical fiber amplifier in which Tm (thulium) that is one of rare earth elements is doped has been recently researched and developed in order to effectively use an entire area of a low loss band (1450 to 1650 nm) of a quartz optical fiber transmission path as a wavelength resource. developed in order to effectively use an entire area of a low loss band (1450 to 1650 nm) of a quartz optical fiber transmission path as a wavelength resource.

One example of this Tm dopant optical fiber amplifier reports that a gain band can be generated in a 1.47 $\mu$m band by using a laser light of a 1.05 $\mu$m band as an exciting light source (refer to Japanese Patent Gazette (Jp-B-2688303)).

Also, another example of the Tm dopant optical fiber amplifier reports that a gain band can be shifted to a longer wave side, from the original Tm gain band (a 1.47 $\mu$m band) to a 1.49 $\mu$m band (hereafter, referred to as a gain shift) by using the lights of two wavelengths of 1.05 $\mu$m and 1.56 $\mu$m as an excitation (refer to Optics Letters vol.24 p.1684, 1999).

Figure 1:
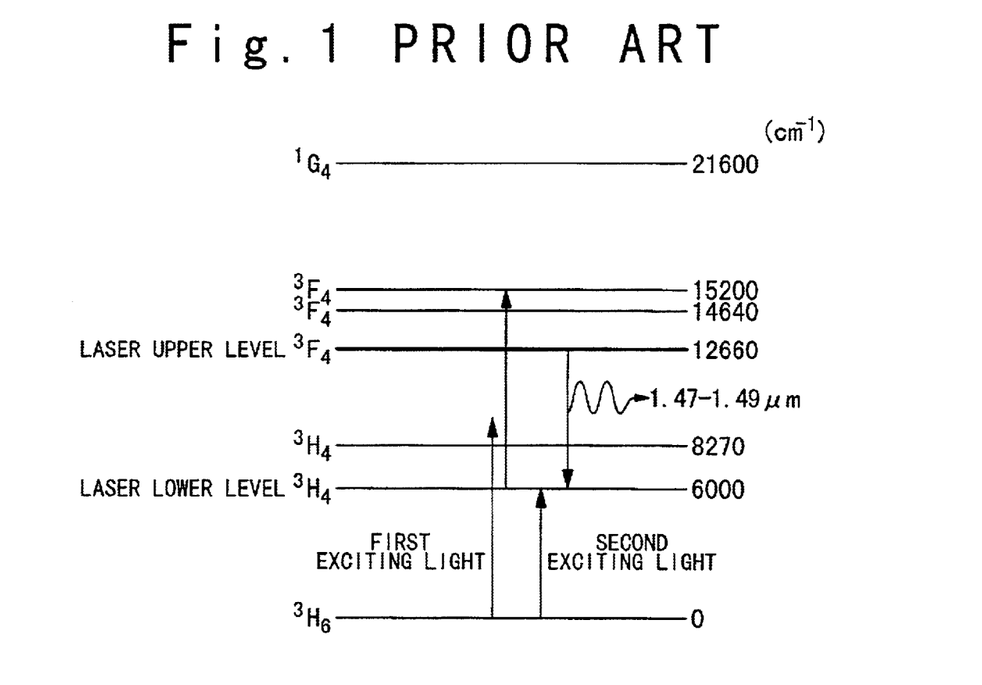
FIG. 1 is a diagram showing an energy level structure of thulium (Tm) and a level scheme and transitions of first and second exciting light sources.

FIG. 1 shows the transitions of a first excitation light having a wavelength of 1.05 $\mu$m and a second excitation light having a wavelength of 1.56 $\mu$m, in a Tm energy level.

Figure 2:
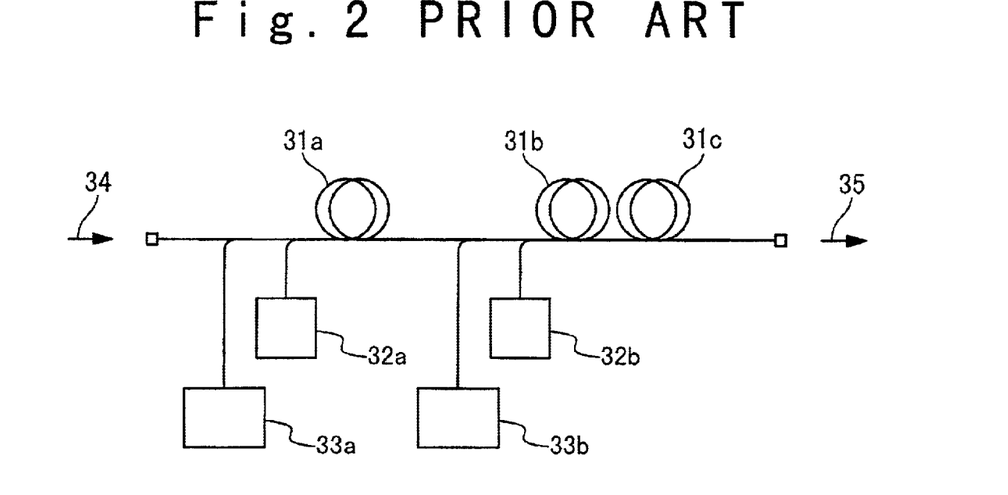
FIG. 2 is a configuration view showing a conventional two-wavelength excitation Tm dopant fiber amplifier.

FIG. 2 is a configuration view showing an example of a conventional two-wavelength excitation Tm dopant optical fiber amplifier. Tm dopant optical fiber modules 31a to 31c are connected in series. In order to introduce an excitation light, a first exciting light source 32a having a wavelength of 1.05 $\mu$m and a second exciting light source 33a having a wavelength of 1.56 $\mu$m are connected at the input side of the Tm dopant optical fiber module 31a through a proper wavelength multiplexing optical coupler (not shown). Similarly, a first exciting light source 32b and a second exciting light source 33b are connected at the input side of the Tm dopant optical fiber module 31b through a proper wavelength multiplexing optical coupler (not shown).

In this two-wavelength excitation Tm dopant optical fiber amplifier, an input signal 34 inputted to the Tm dopant optical fiber module 31a is amplified while sequentially passed through the Tm dopant optical fiber modules 31a to 31c, and outputted as an output signal 35 from the Tm dopant optical fiber module 31c.

In this two-wavelength excitation Tm dopant optical fiber amplifier, a gain of 25 dB and a noise factor (noise figure) of 5 dB are attained in a band between 1475 and 1510 nm.

Typically, as an excitation configuration in the optical fiber amplifier, there are a forward excitation for introducing an excitation light in a direction equal to that of a signal light from a forward portion (an input side) of an optical fiber, a backward excitation for introducing an excitation light in a direction opposite to that of a signal light, and a two-way excitation for jointly using them.

A feature of the forward excitation lies in a small noise. A feature of the backward excitation lies in a high output and a high efficiency. And, a feature of the two-way excitation lies in the fact that it has both the features of the forward and backward excitations. Especially, in the backward excitation, a distribution of an excitation strength in a longitudinal direction in the Tm dopant optical fiber coincides with a distribution of a strength of a signal which is amplified while it is transmitted. An operation efficiency is high since the excitation strength is high at a portion where the signal strength is high.

Figure 3:
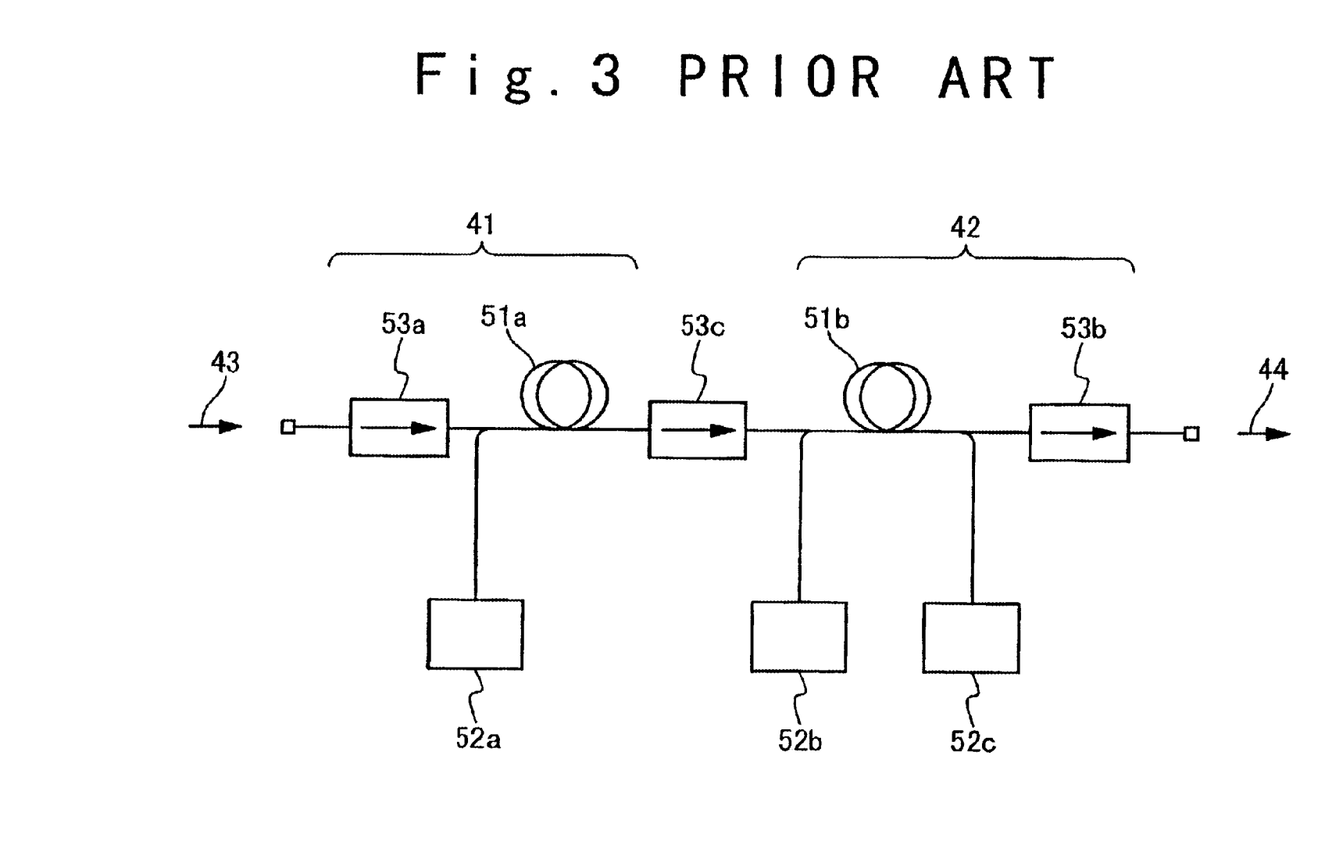
FIG. 3 is a configuration view showing an conventional optical fiber amplifier having a configuration of plurality of stages.

FIG. 3 is a configuration view showing a conventional example composed of a plurality of stages of optical fiber amplifiers in which rare earth elements, such as Er (erbium) and the like, are doped. A former stage 41 is composed of a rare earth dopant optical fiber module 51a, an exciting light source 52a for introducing an excitation light and an isolator 53a. A latter stage 42 is composed of a rare earth dopant optical fiber module 51b, exciting light sources 52b, 52c for carrying out a two-way excitation and an isolator 53b. The former stage 41 and the latter stage 42 are connected in series through an isolator 53c.

In this rare earth dopant optical fiber amplifier, an input signal 43 inputted through the isolator 53a to the rare earth dopant optical fiber module 51a is amplified while sequentially passed through the rare earth dopant optical fiber modules 51a, 51b. Then, it is outputted as an output signal 44 from the isolator 53b. Accordingly, the former stage 41 is forwardly excited by the exciting light source 52a so that the small noise is attained. The latter stage 42 is excited in the two-way by the exciting light sources 52b, 52c so that the high gain and the high efficiency are attained.

The Er dopant optical fiber amplifier is detailed in "Electronics Letters" vol.34, p.567, 1998, and "Electronics Letters" vol.34, p.1747, 1998.

By the way, in the above-mentioned conventional two-wavelength excitation Tm dopant optical fiber amplifier, an efficiency (a ratio of an amplifier output power to an excitation power) is low, such as about several percents or less. Thus, even if the excitation power is about 500 mW, an amplifier output in a signal wavelength of 1500 nm is about +6 dB at most. This results in a problem of a lack of the amplifier output.

For example, when an amplifier output necessary for a transmitter, a relay or the like is roughly calculated under an assumption of a typical wavelength multiplexing light communication system of about 16 waves, if an input power per channel of a signal is −25 dBm/ch and a fiber amplifier gain is 25 dB, an amplifier output of +12 dBm is required. Thus, the amplifier output becomes short in the current system.

Here, it is considered that the reason why the efficiency of the two-wavelength excitation Tm dopant optical fiber amplifier is lower than that of the Er dopant optical fiber amplifier lies in the employment of the forward excitation configuration. Thus, in order to improve the efficiency, it is considered to apply the backward excitation for introducing the excitation light from behind (output sides of) the Tm dopant optical fiber modules 31a to 31c or the two-way excitation, even in the two-wavelength excitation Tm dopant optical fiber amplifier.

However, in the conventional two-wavelength excitation Tm dopant fiber amplifier, the execution of the backward excitation or the two-way excitation with the two-wavelength causes the noise factor to be extremely deteriorated (increased), which results in the extremely poor property as the optical fiber amplifier.

SUMMARY OF THE INVENTION

The present invention is accomplished in view of the above mentioned problems. Therefore, an object of the present invention is to provide an optical fiber amplifier that can attain a sufficient gain shift effect, a small noise property and a high operation efficiency at the same time even in a two-wavelength excitation Tm dopant optical fiber amplifier, and an optical amplifier having the same.

In order to achieve an aspect of the present invention, laser amplifier includes: a gain medium of a glass fiber including rare earth dopant in a host medium, ions of the rare earth dopant having an energy level structure including a ground level and a pair of laser upper level and laser lower levels between which a stimulated transition is to be produced after production of a population inversion between the pair of laser upper and laser lower levels, the pair of laser upper and laser lower levels being higher than the ground level; a first exciting light source coupled to the input side of the glass fiber for introducing first exciting light to the glass fiber to produce the population inversion; a second exciting light source coupled to the input side of the glass fiber for introducing second exciting light source to the glass fiber to raise ions of the rare earth dopant from the ground level to the laser lower level, the second exciting light having a wavelength band different from a wavelength band of the first exciting light; and another first exciting light source coupled to the output side of the glass fiber for introducing the first exciting light to the glass fiber, and wherein a two-way excitation is performed on the glass fiber.

In this case, the two-way excitation is performed on the glass fiber without providing another second exciting light source coupled to the output side of the glass fiber for introducing the second exciting light to the glass fiber.

Also in this case, the rare earth dopant is selected from a group consisting of thulium(Tm), holmium(Ho), erbium(Er) and praseodymium(Pr).

Further in this case, the ions of the rare earth dopant are thulium ions ($Tm^{3+}$).

In this case, the first exciting light source produces light having a wavelength band ranging from 1.04 $\mu$m to 1.07$\mu$m, and the second exciting light source produces light having a wavelength band ranging from 1.53 $\mu$m to 1.90 $\mu$m.

Also in this case, the glass fiber is a fluoride-based glass fiber including rare earth dopant in a host medium.

Further in this case, the host medium is fluorozirconiumate glass.

In this case, the ions of the rare earth dopant are erbium ions ($Er^{3+}$).

Also in this case, the first exciting light source produces light having a wavelength selected from a wavelength of 0.81 $\mu$m and a wavelength of 0.98 $\mu$m, and the second exciting light source produces light having a wavelength band ranging from 1.45 $\mu$m to 1.57 $\mu$m.

Further in this case, the ions of the rare earth dopant are holmium ions ($Ho^{3+}$).

In this case, the first exciting light source produces light having a wavelength selected from a wavelength of 0.89 $\mu$m and a wavelength of 1.15 $\mu$m, and the second exciting light source produces light having a wavelength band ranging from 1.8 $\mu$m to 2.1 $\mu$m.

In order to achieve another aspect of the present invention, a laser amplifier includes: a gain medium of a plurality of stages of a plurality of glass fibers coupled to each other in series, each of the plurality of glass fibers including rare earth dopant in a host medium, and ions of the rare earth dopant having an energy level structure including a ground level and a pair of laser upper level and laser lower levels between which a stimulated transition is to be produced after production of a population inversion between the pair of laser upper and laser lower levels, the pair of laser upper and laser lower levels being higher than the ground level; a first exciting light source coupled to the input side of the glass fiber of a specific stage other than at least a final stage of the plurality of stages for introducing first exciting light to the glass fiber of the specific stage to produce the population inversion; a second exciting light source coupled to the input side of the glass fiber of the specific stage for introducing second exciting light source to the glass fiber to raise ions of the rare earth dopant from the ground level to the laser lower level, the second exciting light having a wavelength band different from a wavelength band of the first exciting light; a third exciting light source coupled to the input side of the glass fiber of the final stage for introducing the first exciting light to the glass fiber of the final stage to produce the population inversion; a fourth exciting-light source coupled to the input side of the glass fiber of the final stage for introducing the second exciting light source to the glass fiber of the final stage; and another third exciting light source coupled to the output side of the glass fiber of the final stage for introducing the first exciting light to the glass fiber of the final stage, and wherein a two-way excitation is performed on the glass fiber of the final stage.

In this case, the laser amplifier further includes: an optical isolator provided between the specific stage and the final stage, wherein the optical isolator protects ASE (Amplified Spontaneous Emission) generated in the final stage from getting into the specific stage.

Also in this case, the two-way excitation is performed on the glass fiber of the final stage without providing another fourth exciting light source coupled to the output side of the glass fiber of the final stage for introducing the second exciting light to the glass fiber of the final stage.

Further in this case, the rare earth dopant is selected from a group consisting of thulium(Tm), holmium(Ho), erbium (Er) and praseodymium(Pr).

In this case, the ions of the rare earth dopant are thulium ions ($Tm^{3+}$).

Also in this case, the first exciting light source produces light having a wavelength band ranging from 1.04 $\mu$m to 1.07 $\mu$m, and the second exciting light source produces light having a wavelength band ranging from 1.53 $\mu$m to 1.90 $\mu$m.

Further in this case, the glass fiber is a fluoride-based glass fiber including rare earth dopant in a host medium.

In this case, the host medium is fluorozirconiumate glass.

In order to achieve still another aspect of the present invention, a laser amplifier apparatus, includes: a first laser amplifier; and a second laser amplifier coupled to the first laser amplifier in series or parallel, and wherein at least one of the first and second laser amplifiers includes: a first exciting light source coupled to the input side of the glass fiber for introducing first exciting light to the glass fiber to produce the population inversion; a second exciting light source coupled to the input side of the glass fiber for introducing second exciting light source to the glass fiber to raise ions of the rare earth dopant from the ground level to the laser lower level, the second exciting light having a wavelength band different from a wavelength band of the first exciting light; and another first exciting light source coupled to the output side of the glass fiber for introducing the first exciting light to the glass fiber, and wherein a two-way excitation is performed on the glass fiber.

DESCRIPTION OF THE PREFERRED EMBODIMENTS

Respective embodiments of an optical fiber amplifier in the present invention will be described below with reference to the attached drawings.

It should be noted that there is a copending U.S. patent application Ser. No. 09/527421, entitled "Laser oscillator and laser amplifier", claiming priorities based on Japanese patent application No. Heisei 11-075704 and Japanese patent application No. Heisei 11-156745, invented by Tadashi Kasamatsu who is an inventor of the present application, and assigned to an assignee who is an assignee of the patent application. The content of the copending US application is incorporated herein by reference.

[First Embodiment]

Figure 4:
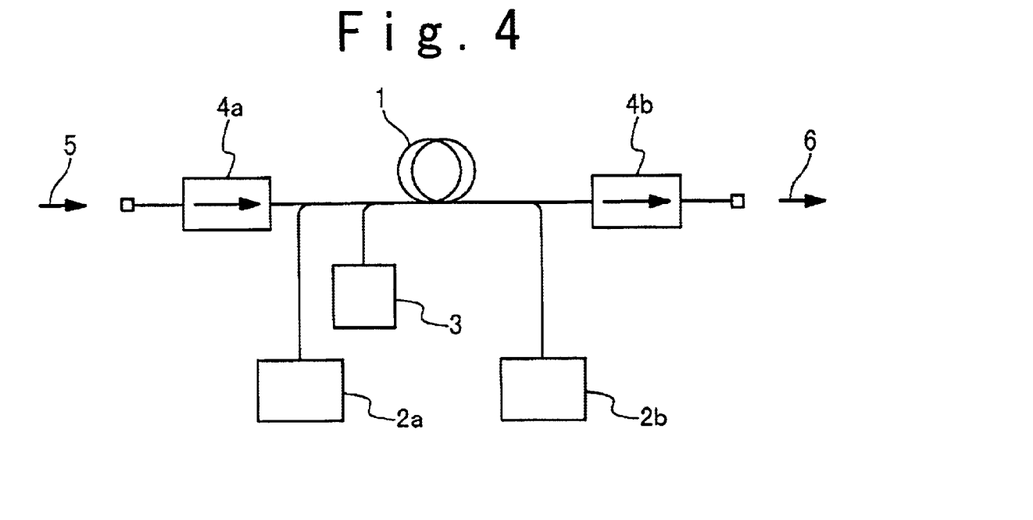
FIG. 4 is a configuration view showing an optical fiber amplifier of a first embodiment in the present invention.

FIG. 4 is a configuration view showing a two-wavelength excitation Tm dopant optical fiber amplifier of a first embodiment in the present invention. In order to introduce an excitation light to a Tm dopant optical fiber module (glass fiber) 1, a first exciting light source 2a having a wavelength of a 1.05 μm band and a second exciting light source 3 having a wavelength of a 1.56 μm band are connected through a proper wavelength multiplexing optical coupler (not shown), at an input side of the Tm dopant optical fiber module 1. In order to introduce an excitation light to the Tm dopant optical fiber module 1, a first exciting light source 2b having a wavelength of a 1.05 μm band is connected through a proper wavelength multiplexing optical coupler (not shown), similarly behind (at an output side of) the Tm dopant optical fiber module 1. Isolators 4a, 4b for suppressing the undesirable laser oscillation caused by a return light are connected to a signal input port and an output port of the Tm dopant optical fiber module 1, respectively.

The Tm dopant optical fiber module 1 is the fluoride-based optical fiber, in which Tm is doped in base material made of fluoro-zirconate glass. The Tm dopant fluoride-based optical fiber is used as an amplification fiber. Then, attention is paid to a stimulated transition of thulium (Tm) from $^3F_4$ to $^3H_4$ (1.47 μm band)

This Tm dopant optical fiber module 1 has the module form in which the density of thulium (Tm) is 2000 ppm, a core diameter is 2.0 μm, and a fiber length is 20 m.

The first exciting light sources 2a, 2b are intended to produce population inversion between a pair of upper and lower levels that are higher than a ground level in the Tm dopant optical fiber module 1. For example, as each of the first exciting light sources 2a, 2b, a ytterbium (Yb) optical fiber laser (having a maximum output of 500 mW) having a wavelength of 1.05 μm band is preferably used.

The second exciting light source 3 is set so as to be included in a ground level absorption stimulated transition from a ground level $^3H_6$ of Tm to $^3H_4$. In this absorption stimulated transition, the wavelength has a peak at about 1.65 μm, and it is extended from 1.53 μm to 1.9 μm. For example, an Er dopant optical fiber laser (having a maximum output of 500 mW) of a 1.56 μm band is preferably used which corresponds to a base of the absorption stimulated transition.

This optical fiber amplifier uses a semiconductor laser in which a wavelength is variable from 1.45 μm to 1.55 μm and a signal input power is −30 dBm, as a signal light source for measuring a gain. Also, a saturation signal in which a wavelength is 1500 nm and a signal power is −10 dBm is inputted simultaneously with the above-mentioned signal. An amplification output of this saturation signal is defined as an output of this optical fiber amplifier.

In this optical fiber amplifier, after an input signal 5 passes though an isolator 4a, it is amplified while it passes though the Tm dopant optical fiber module 1. Then, it is outputted as an output signal 6 from an isolator 4b.

Figure 5:
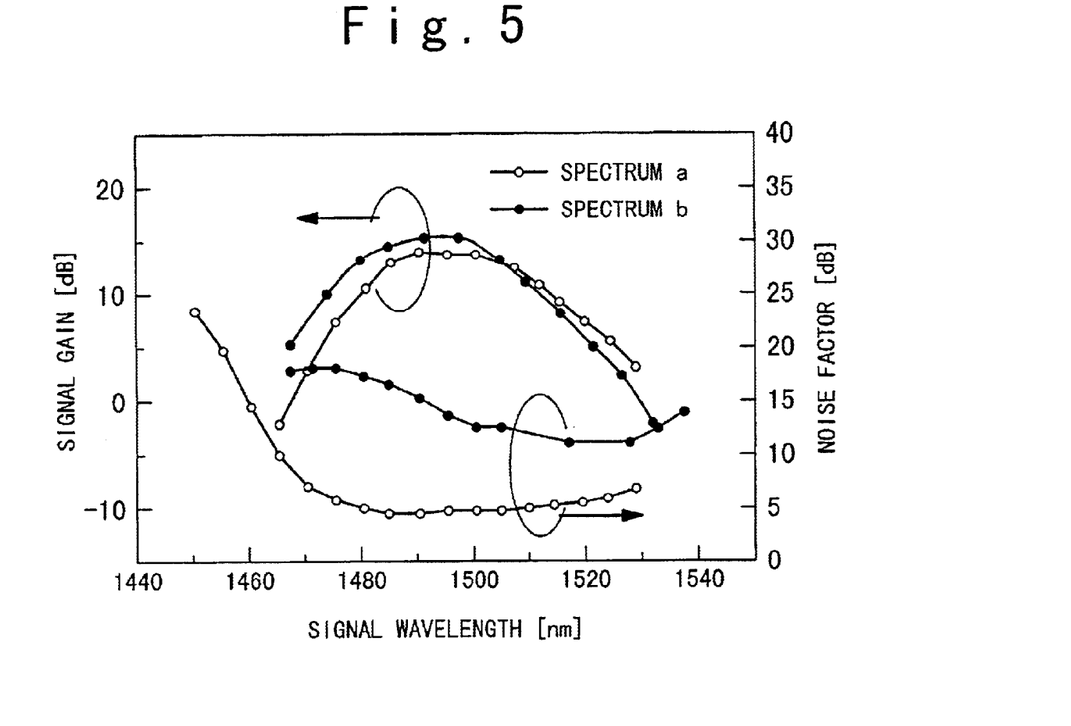
FIG. 5 is a view showing a gain and a noise factor of the optical fiber amplifier of the first embodiment in the present invention.

FIG. 5 is a view showing a gain and a noise factor of this optical fiber amplifier. A spectrum a in FIG. 5 indicates a gain and a noise factor when an output power of the first exciting light source 2a is 200 mW and an output power of the first exciting light source 2b is 100 mW and an output power of the second exciting light source 3 is 40 mW. That is to say, the spectrum a in FIG. 5 corresponds to the configuration shown in FIG. 4. A spectrum b indicates a gain and a noise factor when the output power of the first exciting light source 2a is 200 mW, and the output power of the first exciting light source 2b is 100 mW, and an excitation light of an output power of 40 mW is introduced from the second exciting light source 3 to the Tm dopant optical fiber module 1, and an excitation light of an output power of 40 mW is introduced from a second exciting light source (not shown in FIG. 4) having a wavelength of a 1.56 μm band to the Tm dopant optical fiber module 1 from at an output side of the Tm dopant optical fiber module 1.

According to FIG. 5, the gains are not largely changed in both the spectra a and the spectrum b. However, it is known that the noise factor of the spectrum b deteriorates extremely when the wavelength of the spectrum b is in 1460 to 1520 nm. Here, the deterioration in the noise factor between about 5 dB and 10 dB is admitted.

Also, in the spectrum a, when the wavelength of the saturation signal is 1500 nm, the gain is small such as about 13 dB. However, this depends on the number of Tm ions in the optical fiber.

With regard to the output of this optical fiber amplifier (=the output of the saturation signal), the total excitation power is about +3 dBm at 340 mW. Thus, it is possible to attain the increase in the output of about two times (6 dB) as compared with the case when the amplifier output in the forward excitation of the two-wavelength is +0 dBm.

In an optical fiber amplifier of the embodiment, the population inversion is produced between desired energy levels by using a light outputted from the first exciting light source, and a laser amplification operation is attained by the stimulated transition. Moreover, the light outputted from the second exciting light source increases a laser lower level density. Thus, an effective gain peak wavelength is shifted to a longer wave side.

For example, the forward excitation of the Tm dopant optical fiber at the two-wavelength attains a gain shift and a small noise, and the backward excitation by a light outputted from the single first exciting light source from the back portion (the output side) of the Tm dopant optical fiber enables a signal light to be effectively amplified and attains a high efficiency and a high gain.

By the way, the backward execution of the Tm dopant optical fiber at the two-wavelength is not desirable since the noise factor is extremely deteriorated. The deterioration of the noise factor is as follows. That is, the light outputted from the second exciting light source from the back portion of the Tm dopant optical fiber excessively deteriorates the population inversion rate of a former portion of the optical fiber, and simultaneously involves the occurrence of an ASE component that does not contribute to a gain in a latter portion of the optical fiber.

In this embodiment, the high gain and the small noise can be attained in a gain shift band, in the former portion of the Tm dopant optical fiber. Thus, it is possible to attain the small noise in the entire optical fiber amplifier. This is because the noise factor of the optical fiber amplifier is substantially determined on the basis of the population inversion in an inlet portion of the amplification optical fiber.

[Second Embodiment]

Figure 6:
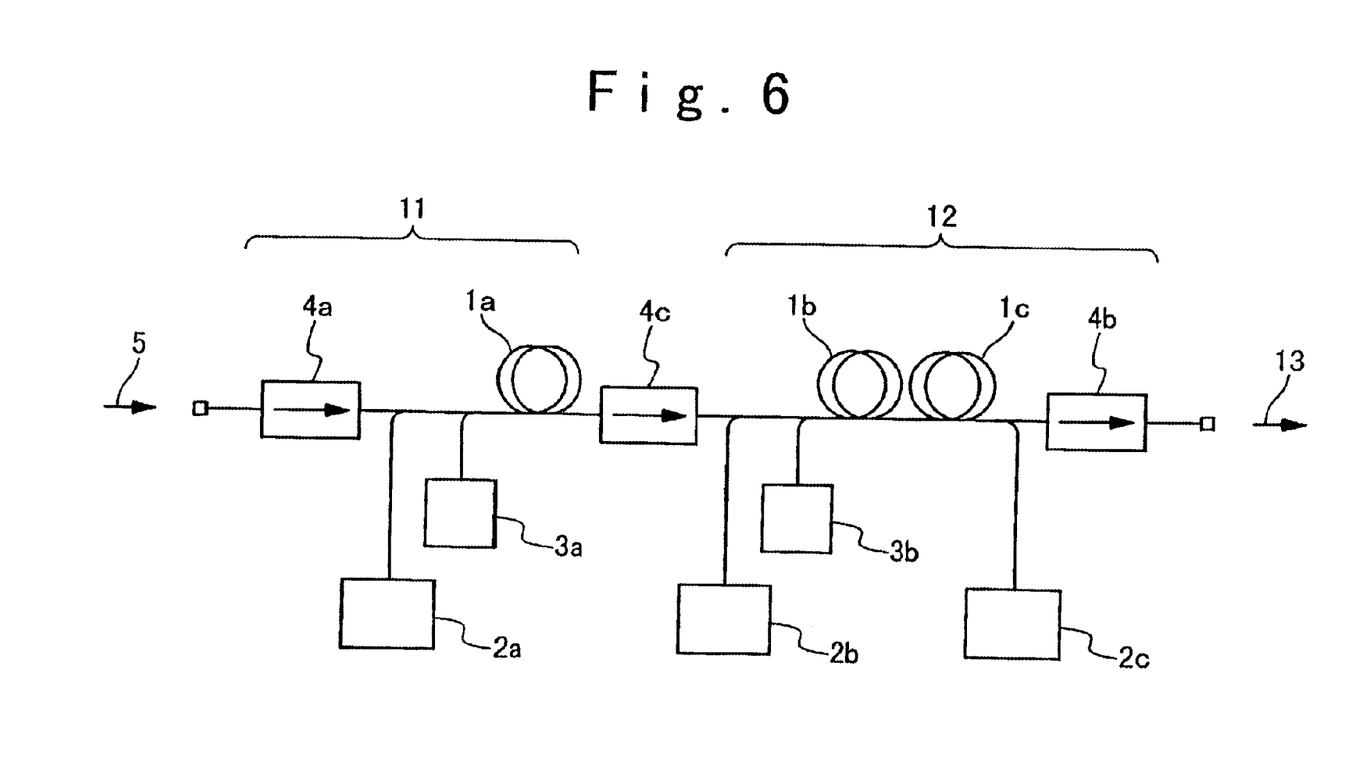
FIG. 6 is a configuration view showing an optical fiber amplifier of a second embodiment in the present invention.

FIG. 6 is a configuration view showing a many-stage-type two-wavelength excitation Tm dopant optical fiber amplifier of a second embodiment in the present invention. For the sake of the excitation using the two-wavelength (a first excitation light and a second excitation light), a first exciting light source 2a having a wavelength of a 1.05 μm band and a second exciting light source 3a having a wavelength of a 1.56 μm band are connected through a proper wavelength multiplexing optical coupler (not shown), at an input side of a Tm dopant optical fiber module 1a to introduce excitation light to the Tm dopant optical fiber module 1a. An isolator 4a for suppressing an undesirable laser oscillation caused by a return light is connected to a signal input port of this Tm dopant optical fiber module 1. A first stage 11 includes the isolator 4a, the first exciting light source 2a, the second exciting light source 3a and the Tm dopant optical fiber module 1a.

For the sake of the excitation using the two-wavelength (the first excitation light and the second excitation light) similar to the above-mentioned case, a first exciting light source 2b having a wavelength of a 1.05 μm band and a second exciting light source 3b having a wavelength of a 1.56 μm band are connected through a proper wavelength multiplexing optical coupler (not shown), at an input side of Tm dopant optical fiber modules 1b, 1c connected with each other in series to introduce excitation light to the Tm dopant optical fiber modules 1b, 1c.

A first exciting light source 2c having a wavelength of a 1.05 μm band is connected through a proper wavelength multiplexing optical coupler (not shown), at an output side of those Tm dopan optical fiber modules 1b, 1c to introduce an excitation light to those Tm dopan optical fiber modules 1b, 1c.

An isolator 4b for suppressing an undesirable laser oscillation caused by a return light is connected to a signal output port of this Tm dopant optical fiber module 1c. A second stage 12 includes the first exciting light source 2b, the second exciting light source 3b, those Tm dopan optical fiber modules 1b, 1c, the first exciting light source 2c and the isolator 4b.

Here, the Tm dopant optical fiber modules 1b, 1c connected in series may be replaced by a module having a length of 20 m in which the density of the Tm dopant optical fiber module 1b is doubled (4000 ppm).

An isolator 4c for protecting ASE (Amplified Spontaneous Emission), which is generated in the second stage 12 and moved forward in a direction opposite to that of a signal, from getting into the first stage 11 is inserted between the first stage 11 and the second stage 12.

In this optical fiber amplifier, the Tm dopant optical fiber is lengthened in order to increase a gain as an amplifier. This reason is as follows. That is, even if the Tm optical fiber is merely lengthened, the increase of the gain can not be expected. So, an attention is paid to a fact that an excitation strength distribution in an optical fiber is substantially null if the optical fiber is lengthened to some degree (about two times the absorption length). Thus, it is necessary to lengthen by connecting a plurality of excited optical fibers having proper lengths.

In this optical fiber amplifier, the first exciting light source 2a and the second exciting light source 3a are used in the fist stage 11 such that the Tm dopant optical fiber module 1a is excited at the two-wavelength excitation, from the forward portion (the input side) of the Tm dopant optical fiber module 1a.

Also, the first exciting light source 2b and the second exciting light source 3b are used in the second stage 12 such that the Tm dopant optical fiber modules 1b, 1c are excited at the two-wavelength excitation from the forward portion of the Tm dopant optical fiber modules 1b, 1c. And, in the second stage 12, the first exciting light source 2c is used such that the Tm dopant optical fiber modules 1b, 1c are excited from the back portion (the output side) of the Tm dopant optical fiber modules 1b, 1c.

Accordingly, the input signal 5 is amplified while it passes through the Tm dopant optical fiber modules 1a to 1c, and outputted as an output signal 13 from the isolator 4b.

Figure 7:
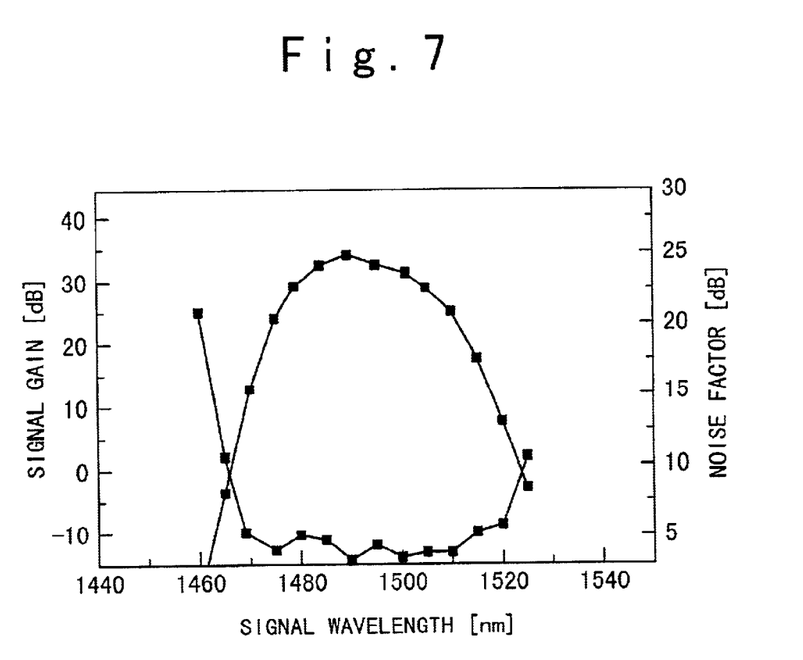
FIG. 7 is a view showing a gain and a noise factor of the optical fiber amplifier of the second embodiment in the present invention.

FIG. 7 is a view showing a gain and a noise factor of this optical fiber amplifier. That is, FIG. 7 shows the gain and the noise factor when respective output powers of the first exciting light sources 2a, 2b are 200 mW, an output power of the first exciting light source 2c is 100 mW, and an excitation light having an output power of 40 mW is introduced from the second exciting light source 3a to the Tm dopant optical fiber module 1a, and an excitation light having an output power of 40 mW is introduced from the second exciting light source 3b to the Tm dopant optical fiber module 1b.

According to FIG. 7, it is possible to obtain the gain of 25 dB or more and the noise factor of 5 dB or less. Also, it is possible to attain the amplifier output of +15 dBm or more. Moreover, it is checked that even in the same excitation power, the amplifier output becomes +6 dBm if the backward excitation using the first exciting light source 2c in the second stage 12 is removed.

As mentioned above, it is possible to largely improve the amplifier output.

Moreover, an isolator 4c for protecting ASE from getting into the first stage 11 is inserted between the first stage 11 and the second stage 12. Thus, it is possible to attain the stable operation of the optical fiber amplifier and the high efficiency of the gain shift.

In order to attain the high gain and the high efficiency together with the gain shift effect, it is effective to employ a two-way excitation configuration in which a Tm dopant optical fiber of a proper length is divided into a plurality of fibers, and a forward excitation using the two-wavelength is configured in a first stage portion of the plurality of fibers, and the forward excitation using the two-wavelength and the backward excitation using a first exciting light source are jointly configured on and after a second stage portion of the plurality of fibers. Also in this case, the noise factor is substantially determined in the former (former stage) portion of the Tm dopant optical fiber. Thus, the forward excitation that can attain the small noise in the former portion is employed.

The connection of the Tm dopant optical fiber properly excited as mentioned above enables a fiber length to be lengthened and enables the high gain and the high efficiency to be attained.

In the configuration of the plurality of stages, the insertion of a light isolator of a signal wavelength band between the stages is important in making the optical fiber amplifier more stable and making its efficiency higher. This is because ASE (Amplified Spontaneous Emission) generated on the latter stage side on and after the second stage is transmitted even in a direction opposite to that of a signal, and excessively reduces a stimulated transition in the fiber at the former stage, and thereby deteriorates the property of the entire optical fiber amplifier.

As mentioned above, the respective embodiments of the optical fiber amplifier in the present invention have been described with reference to the drawings. However, the actual configuration is not limited to those embodiments. The modification of the design and the like can be done in the range without departing from the spirit of the present invention.

For example, the above-mentioned embodiments describe the example using one or three Tm dopant optical fiber modules. However, the number of Tm dopant optical fiber modules, the length and the shape, the density of Tm and the like may be suitably changed so as to obtain the desirable gain and amplifier output. They are not limited to those of the above-mentioned embodiments.

The above-mentioned embodiments use the optical fiber module in which Tm is doped. However an element to be doped may be a rare earth element having an emission transition using a stimulated transition between energy levels higher than the grand level. It is not especially limited to Tm.

Also, the wavelengths of the first exciting light sources 2a to 2c can be suitably selected for their emission transitions. It is enough that they can constitute the optical fiber amplifier. Moreover, the wavelengths of the second exciting light sources 3, 3a and 3b may be those that have the wavelengths suitable for the excitation from the ground level to the lower laser level.

In the above-mentioned embodiments, the first exciting light sources 2a to 2c are used as the Yb optical fiber laser, and the second exciting light sources 3, 3a and 3b are used as the Er dopant optical fiber laser. However, the semiconductor laser, the Er dopant optical fiber laser, the combination of the semiconductor laser and the optical fiber amplifier (for example, a 1.55 µm band DFB laser and an Er dopant optical fiber amplifier) or various kinds of solid state lasers (a titanium sapphire, a semiconductor laser excitation Nd:YAG laser and the like) may be used.

Moreover, a gain of a wide band can be attained by connecting the optical fiber amplifier of the present invention and the conventional optical fiber amplifier in series and/or in parallel.

As mentioned above, according to the optical fiber amplifier of the present invention, it is possible to attain the optical fiber amplifier having the high efficiency and the small noise in which the gain peak wavelength is shifted to the longer wavelength. Thus, it is possible to correspond to the large capacity needing the wider amplification wavelength band by jointly using the optical fiber amplifier of the present invention and the optical fiber amplifier that does not shift the gain peak. As a result, it is possible to carry out the wavelength multiplexing communication with the small noise and the small transition loss.

What is claimed is:

1. A laser amplifier comprising: a single gain medium of a glass fiber including rare earth dopant in a host medium, ions of said rare earth dopant having an energy level structure including a ground level and a pair of laser upper level and laser lower levels between which a stimulated transition is to be produced after production of a population inversion between said pair of laser upper and laser lower levels, said pair of laser upper and laser lower levels being higher than said ground level; a first exciting light source coupled to the input side of said glass fiber for introducing first exciting light to said glass fiber to produce said population inversion; a second exciting light source coupled to the input side of said glass fiber for introducing a second exciting light to said glass fiber to raise ions of said rare earth dopant from said ground level to said laser lower level, said second exciting light having a wavelength band different from a wavelength band of said first exciting light; and another first exciting light source coupled to the output side of said glass fiber for introducing another first exciting light to said glass fiber, and wherein a two-way excitation is performed on said glass fiber, and without providing another second exciting light source coupled to the output side of said glass fiber for introducing said second exciting light to said glass fiber.

2. The laser amplifier according to claim 1, wherein said rare earth dopant is selected from a group consisting of thulium(Tm), holmium(Ho), erbium(Er) and praseodymium (Pr).

3. The laser amplifier according to claim 1, wherein the ions of said rare earth dopant are thulium ions ($Tm^{3+}$).

4. The laser amplifier according to claim 1, wherein said first exciting light source produces light having a wavelength band ranging from 1.04 µm to 1.07 µm, and said second exciting light source produces light having a wavelength band ranging from 1.53 µm to 1.90 µm.

5. The laser amplifier according to claim 1, wherein said glass fiber is a fluoride-based glass fiber including rare earth dopant in a host medium.

6. The laser amplifier according to claim 1, wherein said host medium is fluorozirconiumate glass.

7. The laser amplifier according to claim 1, wherein the ions of said rare earth dopant are erbium ions ($Er^{3+}$).

8. The laser amplifier according to claim 1, wherein said first exciting light source produces light having a wavelength selected from a wavelength of 0.81 µm and a wavelength of 0.98 µm, and said second exciting light source produces light having a wavelength band ranging from 1.45 µm to 1.57 µm.

9. The laser amplifier according to claim 1, wherein the ions of said rare earth dopant are holmium ions ($Ho^{3+}$).

10. The laser amplifier according to claim 9, wherein said first exciting light source produces light having a wavelength selected from a wavelength of 0.89 µm and a wavelength of 1.15 µm, and said second exciting light source produces light having a wavelength band ranging from 1.8 µm to 2.1 µm.

11. A laser amplifier comprising: a single gain medium of a plurality of stages of a plurality of glass fibers coupled to each other in series, each of said plurality of glass fibers including rare earth dopant in a host medium, and ions of said rare earth dopant having an energy level structure including a ground level and a pair of laser upper level and laser lower levels between which a stimulated transition is to be produced after production of a population inversion between said pair of laser upper and laser lower levels, said pair of laser upper and laser lower levels being higher than said ground level; a first exciting light source coupled to the input side of said glass fiber of a specific stage other than at least a final stage of said plurality of stages for introducing first exciting light to said glass fiber of said specific stage to produce said population inversion; a second exciting light source coupled to the input side of said glass fiber of said specific stage for introducing second exciting light to said glass fiber to raise ions of said rare earth dopant from said ground level to said laser lower level, said second exciting light having a wavelength band different from a wavelength band of said first exciting light; a third exciting light source coupled to the input side of said glass fiber of said final stage for introducing said first exciting light to said glass fiber of said final stage to produce said population inversion; a fourth exciting light source coupled to the input side of said glass fiber of said final stage for introducing said second exciting light to said glass fiber of said final stage; and another third exciting light source coupled to the output side of said glass fiber of said final stage for introducing said first exciting light to said glass fiber of said final stage, and wherein a two-way excitation is performed on said glass fiber of said final stage without providing another second exciting light source coupled to the output side of said glass fiber for introducing said second exciting light to said glass fiber.

12. The laser amplifier according to claim 11, further comprising:
an optical isolator provided between said specific stage and said final stage, wherein said optical isolator protects ASE (Amplified Spontaneous Emission) generated in said final stage from getting into said specific stage.

13. The laser amplifier according to claim 11, wherein said two-way excitation is performed on said glass fiber of said final stage without providing another fourth exciting light source coupled to the output side of said glass fiber of said final stage for introducing said second exciting light to said glass fiber of said final stage.

14. The laser amplifier according to claim 11, wherein said rare earth dopant is selected from a group consisting of thulium(Tm), holmium(Ho), erbium(Er) and praseodymium (Pr).

15. The laser amplifier according to claim 11, wherein the ions of said rare earth dopant are thulium ions ($Tm^{3+}$).

16. The laser amplifier according to claim 11, wherein said first exciting light source produces light having a wavelength band ranging from 1.04 µm to 1.07 µm, and said second exciting light source produces light having a wavelength band ranging from 1.53 µm to 1.90 µm.

17. The laser amplifier according to claim 11, wherein said glass fiber is a fluoride-based glass fiber including rare earth dopant in a host medium.

18. The laser amplifier according to claim 11, wherein said host medium is fluorozirconiumate glass.

19. A laser amplifier comprising: a single gain medium of at least one glass fiber, each of said at least one glass fiber including rare earth dopant in a host medium, and ions of said rare earth dopant having an energy level structure including a ground level and a pair of laser upper level and laser lower levels between which a stimulated transition is to be produced after production of a population inversion between said pair of laser upper and laser lower levels, said pair of laser upper and laser lower levels being higher than said ground level; a first exciting light source coupled to the input side of said glass fiber for introducing first exciting light to said glass fiber to produce said population inversion; a second exciting light source coupled to the input side of said glass fiber for introducing a second exciting light to said glass fiber to raise ions of said rare earth dopant from said ground level to said laser lower level, said second exciting light having a wavelength band different from a wavelength band of said first exciting light; and another first exciting light source coupled to the output side of said glass fiber for introducing another first exciting light to said glass fiber, and wherein a two-way excitation is performed on said glass fiber without providing another second exciting light source coupled to the output side of said glass fiber for introducing said second exciting light to said glass fiber.

* * * * *